US012794124B2

(12) United States Patent
Lai et al.

(10) Patent No.: US 12,794,124 B2
(45) Date of Patent: Nov. 10, 2026

(54) ANTENNA SUBSTRATE AND ELECTRONIC DEVICE

(71) Applicant: SILICONWARE PRECISION INDUSTRIES CO., LTD., Taichung City (TW)

(72) Inventors: Chia-Chu Lai, Taichung City (TW); Min-Han Chuang, Taichung City (TW); Chien-Sheng Chen, Taichung City (TW)

(73) Assignee: SILICONWARE PRECISION INDUSTRIES CO., LTD., Taichung City (TW)

( * ) Notice: Subject to any disclaimer, the term of this patent is extended or adjusted under 35 U.S.C. 154(b) by 71 days.

(21) Appl. No.: 18/917,161

(22) Filed: Oct. 16, 2024

(65) Prior Publication Data

US 2026/0045698 A1 Feb. 12, 2026

(30) Foreign Application Priority Data

Aug. 6, 2024 (TW) ................................ 113129428

(51) Int. Cl.

| | |
|---|---|
| ***H01Q 1/24*** | (2006.01) |
| ***H01Q 1/38*** | (2006.01) |
| ***H01Q 5/55*** | (2015.01) |
| ***H01Q 9/04*** | (2006.01) |

(52) U.S. Cl.
CPC ............ *H01Q 5/55* (2015.01); *H01Q 9/0414* (2013.01); *H01Q 9/0485* (2013.01)

(58) Field of Classification Search
CPC .. H01Q 1/24; H01Q 1/38; H01Q 5/55; H01Q 9/04; H01Q 9/0414; H01Q 9/0485
See application file for complete search history.

(56) References Cited

U.S. PATENT DOCUMENTS

| | | | | |
|---|---|---|---|---|
| 10,089,573 | B2 * | 10/2018 | Sugimura | G06K 19/07 |
| 10,452,571 | B2 * | 10/2019 | Oster | H04M 9/06 |
| 11,030,507 | B2 * | 6/2021 | Kanaoka | G06K 19/0772 |
| 11,228,103 | B2 * | 1/2022 | Wang | H01P 11/002 |
| 12,449,534 | B2 * | 10/2025 | Wodrich | G01S 13/931 |
| 12,537,311 | B2 * | 1/2026 | Kim | H01Q 1/243 |

* cited by examiner

*Primary Examiner* — Tho G Phan
(74) *Attorney, Agent, or Firm* — Studebaker Brackett PLLC

(57) ABSTRACT

Provided are an antenna substrate and an electronic device. An electronic device includes an antenna substrate and an electronic component provided on the antenna substrate, wherein the antenna substrate includes a circuit module and an antenna module. The circuit module has a waveguide structure, and the antenna module has an antenna layer, whereby the electronic component transmits signals to the antenna layer through the waveguide structure to avoid signal transmission loss at high frequencies.

19 Claims, 3 Drawing Sheets

ANTENNA SUBSTRATE AND ELECTRONIC DEVICE

BACKGROUND

1. Technical Field

The present disclosure relates to an electronic device, and more particularly, to an antenna substrate having an antenna layer and an electronic device.

2. Description of Related Art

At present, wireless communication is developing rapidly, network resource traffic is becoming increasingly large, and the required wireless transmission bandwidth is also increasing. Furthermore, as the communication era evolves to 6G, the transmission speed is dozens of times higher than that of the previous generation. Therefore, to meet larger bandwidth and frequency authorization constraints, the communication frequency may reach sub-THz.

Conventional antenna-in-package (AiP) technology mainly integrates the radio frequency chip (transceiver) and the antenna structure into a single package, wherein the radio frequency chip needs to go through a physical transmission line to the antenna feed point. However, the signal loss at such a high frequency of sub-THz is greatly increased.

Therefore, there is a need for addressing the aforementioned shortcomings in the prior art.

SUMMARY

In view of the aforementioned shortcomings of the prior art, the present disclosure provides an antenna substrate which comprises: a wiring module including a circuit structure and a waveguide structure bonded to the circuit structure; and an antenna module provided on the wiring module and comprising an antenna layer, allowing a signal to be transmitted to the antenna layer through the waveguide structure.

The present disclosure also provides an electronic device, which comprises: an antenna substrate including a wiring module including a circuit structure and a waveguide structure bonded to the circuit structure; and an antenna module provided on the wiring module and including an antenna layer, allowing a signal to be transmitted to the antenna layer through the waveguide structure; and an electronic component provided on the antenna substrate.

In the aforementioned antenna substrate and electronic device, the circuit structure includes a plurality of insulating layers and a plurality of circuit layers formed on the plurality of insulating layers.

In the aforementioned antenna substrate and electronic device, the waveguide structure includes a waveguide cavity, a first metal layer and a second metal layer formed on opposite sides of the waveguide cavity, and a plurality of conductive vias formed in the waveguide cavity.

In the aforementioned antenna substrate and electronic device, the plurality of conductive vias are formed on a side edge of the waveguide cavity to form a waveguide channel surrounded by the plurality of conductive vias in the waveguide cavity.

In the aforementioned antenna substrate and electronic device, a thickness of the waveguide cavity is larger than or equal to 25 microns.

In the aforementioned antenna substrate and electronic device, a distance between the conductive vias on the relatively close two side edges of the waveguide cavity is between one and two times a signal resonance wavelength.

In the aforementioned antenna substrate and electronic device, the electronic component is a radio frequency chip, which is provided on another side of the wiring module of the antenna substrate opposite to a side where the antenna module is provided, allowing the electronic component to transmit a signal to the antenna layer through the waveguide structure.

In the aforementioned antenna substrate and electronic device, the electronic component is provided on the circuit structure of the wiring module and electrically connected to the circuit layer of the circuit structure.

In the aforementioned antenna substrate and electronic device, further include a plurality of conductive components provided on the circuit structure and on the same side as the electronic component.

In the aforementioned antenna substrate and electronic device, the waveguide cavity is made of a dielectric material.

In the aforementioned antenna substrate and electronic device, the waveguide cavity is formed with a cavity containing air.

As can be understood from the above, in the antenna substrate and electronic device of the present disclosure, the waveguide structure transmits the signal energy to the antenna layer, thereby avoiding signal transmission loss at high frequencies.

DETAILED DESCRIPTION

Figure 1:
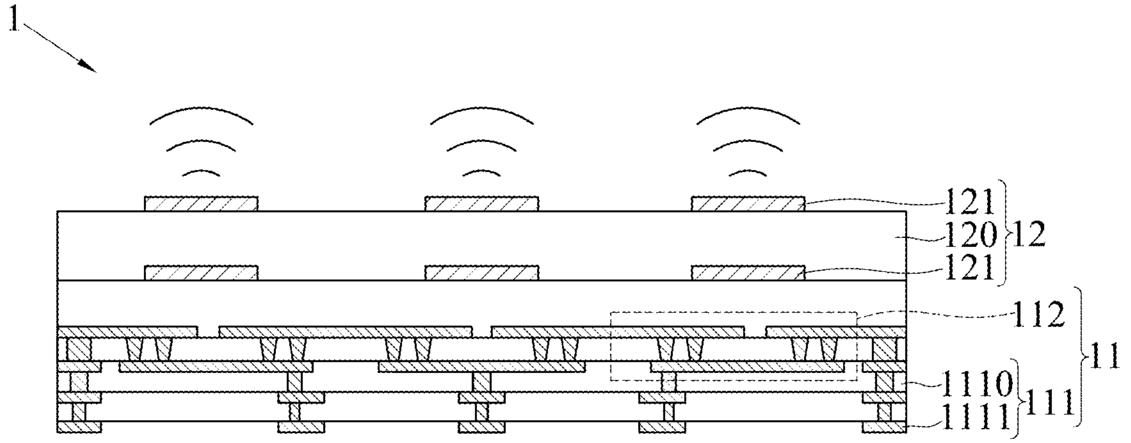
FIG. 1 is a schematic cross-sectional view of an antenna substrate according to the present disclosure.

Implementations of the present disclosure are described below by embodiments. Other advantages and technical effects of the present disclosure can be readily understood by one of ordinary skill in the art upon reading the disclosure of this specification.

It should be noted that the structures, ratios, sizes shown in the drawings appended to this specification are provided in conjunction with the disclosure of this specification in order to facilitate understanding by those skilled in the art. They are not meant, in any ways, to limit the implementations of the present disclosure, and therefore have no substantial technical meaning. Without influencing the effects created and objectives achieved by the present disclosure, any modifications, changes or adjustments to the structures, ratios, or sizes are construed as falling within the scope covered by the technical contents disclosed herein. Meanwhile, terms such as "on," "first," "second," "a," "one," and the like, are for illustrative purposes, and are not meant to limit the scope implementable by the present disclosure. Any changes or adjustments made to the relative relationships, without substantially modifying the technical contents, are also to be construed as within the scope implementable by the present disclosure.

Referring to FIG. 1, which is a schematic cross-sectional view of an antenna substrate 1 according to the present disclosure. The antenna substrate 1 includes a wiring module 11 and an antenna module 12 provided on the wiring module 11.

The wiring module 11 includes a circuit structure 111 and a waveguide structure 112 bonded to the circuit structure 111.

The circuit structure 111 includes a plurality of insulating layers 1110 and a plurality of circuit layers 1111 formed on the insulating layers 1110, such as a redistribution layer (RDL).

In one embodiment, the circuit layer 1111 is made of, for example, copper, and the insulating layer 1110 is made of, for example, polybenzoxazole (PBO), polyimide (PI), prepreg (PP), or other dielectric materials.

Figure 2:
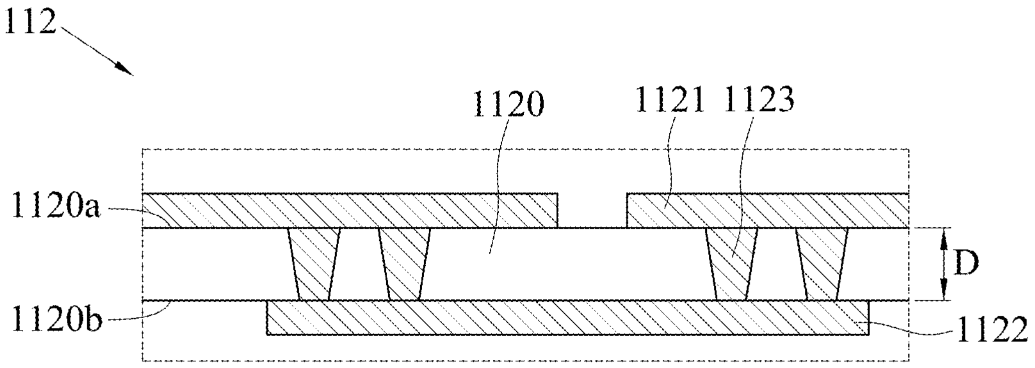
FIG. 2 is a schematic cross-sectional view of partial antenna substrate according to the present disclosure.

Also referring to FIG. 2, the waveguide structure 112 is a resonant structure provided on the circuit structure 111, and includes a waveguide cavity 1120, a first metal layer 1121 and a second metal layer 1122 formed on opposite sides of the waveguide cavity 1120, and a plurality of conductive vias 1123 formed in the waveguide cavity 1120 and electrically connected to the first metal layer 1121 and the second metal layer 1122.

Figure 3:
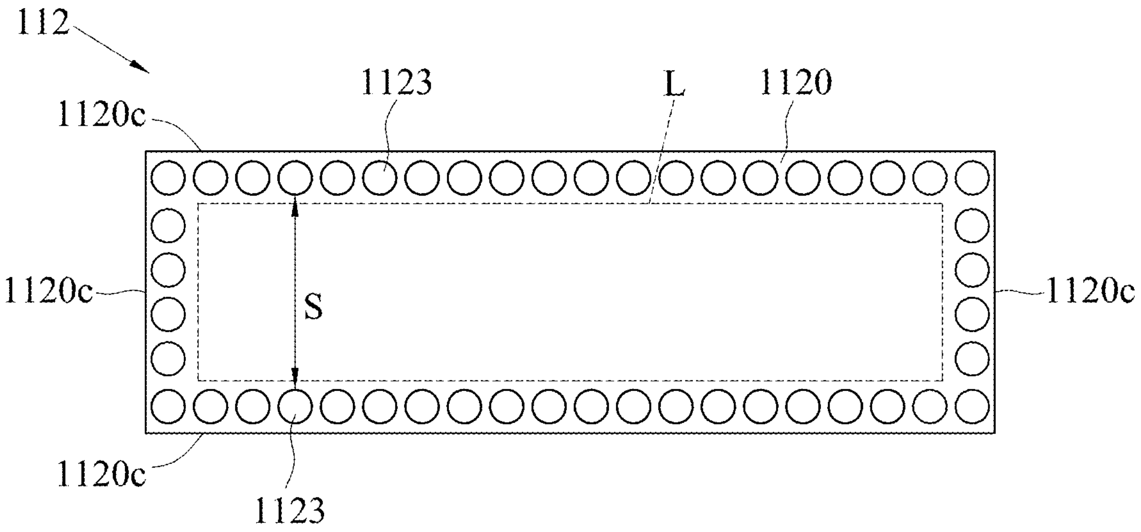
FIG. 3 is a schematic plan view of partial antenna substrate according to the present disclosure.

Also referring to FIG. 3, the waveguide cavity 1120 has a first side 1120*a*, a second side 1120*b* opposite to the first side 1120*a*, and a side edge 1120*c* connecting the first side 1120*a* and the second side 1120*b*. In one embodiment, the waveguide cavity 1120 is a cube with four opposite side edges 1120*c*. The waveguide cavity 1120 may be made of prepreg (PP). In addition, a cavity containing air may be further formed in the waveguide cavity 1120.

The first metal layer 1121 is formed on the first side 1120*a* of the waveguide cavity 1120, and the second metal layer 1122 is formed on the second side 1120*b* of the waveguide cavity 1120. The first metal layer 1121 and the second metal layer 1122 is made of, for example, copper.

The plurality of conductive vias 1123 are arranged on the side edge 1120*c* of the waveguide cavity 1120 to form a waveguide channel L surrounded by the plurality of conductive vias 1123 in the waveguide cavity 1120, allowing signals to be transmitted in the waveguide channel L and to be transmitted outwardly from a gap of the first metal layer 1121.

In one embodiment, a wall body composed of the plurality of conductive vias 1123 retains the signal for transmission in the waveguide cavity 1120. A thickness D of the waveguide cavity 1120 is larger than or equal to (i.e., no less than) 25 microns (um) to effective transmission of energy waves and provide a better transmission space for signals. Meanwhile, in one embodiment of the present disclosure, a distance S (width of the waveguide cavity) between the conductive vias 1123 on the relatively close two side edges 1120*c* of the waveguide cavity 1120 is between one and two times a signal resonance wavelength for better transmission efficiency.

Further, in practical applications, the range of thickness and width of the waveguide cavity 1120 can be adjusted with different signal frequencies. Meanwhile, the waveguide cavity 1120 can be made of materials with different dielectric constants (Dk), or even part of the space (waveguide channel L) may be hollowed out to form a cavity containing air.

In addition, in a practical manufacturing process, the waveguide structure 112 is manufactured by matching up the circuit structure 111. For example, the waveguide cavity 1120 of the waveguide structure 112 can be made of the same material as the insulating layer 1110 of the circuit structure 111, and can be manufactured simultaneously. The first metal layer 1121, the second metal layer 1122 and the plurality of conductive vias 1123 of the waveguide structure 112 can be made of the same material as the circuit layer 1111 of the circuit structure 111, and can be manufactured simultaneously.

The antenna module 12 is provided on the wiring module 11. In one embodiment, the antenna module 12 is provided on the waveguide structure 112 and includes a plurality of antenna layers 121.

The antenna module 12 includes a dielectric layer 120 and a plurality of antenna layers 121 configured on a surface of the dielectric layer 120. In one embodiment, the dielectric layer 120 is made of polybenzoxazole (PBO), polyimide (PI), prepreg (PP) or other dielectric material, which may be the same as or different from the material of the insulating layer.

The antenna layer 121 can be a thin and light patterned antenna layer on the dielectric layer 120 manufactured by sputtering, vaporing, electroplating, electroless plating, chemical plating or foiling. Alternatively, the antenna layer 121 may adopt a patch structure.

Therefore, in the present disclosure, the antenna module 12 is configured with a waveguide structure 112 (resonant structure) to form a resonant cavity to increase the antenna gain.

Figure 4:
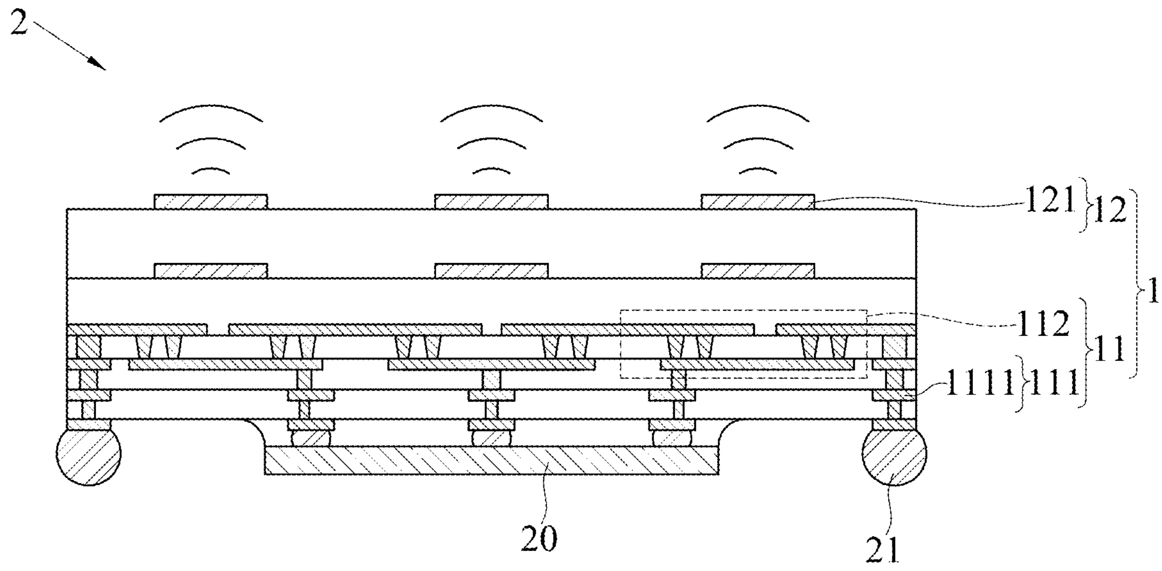
FIG. 4 is a schematic cross-sectional view of an electronic device according to the present disclosure.

Referring to FIG. 4, the present disclosure further discloses an electronic device 2 which includes the aforementioned antenna substrate 1 and an electronic component 20 provided on the antenna substrate 1.

The electronic component 20 is, for example, a radio frequency chip, which is provided on another side of the wiring module 11 of the antenna substrate 1 opposite to a side where the antenna module 12 is provided, allowing the electronic component 20 to transmit a signal to the antenna layer 121 through the waveguide structure 121.

In one embodiment, the electronic component 20 is disposed on the circuit structure 111 of the wiring module 11 and electrically connected to the circuit layer 1111 of the circuit structure 111.

In addition, the electronic device 2 further includes a plurality of conductive components 21 provided on the circuit structure 111 (on the same side as the electronic component). The plurality of conductive components 21 are, for example, spherical shapes such as solder balls, or column-shaped metal materials such as copper pillars and solder bumps, or stud-shaped conductors made by a wire bonding machine, but is not limited thereto. Thus, the electronic device 2 can subsequently be connected to an external device (such as a circuit board) through the plurality of conductive components 21.

In view of the above, in the antenna substrate and electronic device of the present disclosure, the waveguide structure transmits the signal energy to the antenna layer, thereby avoiding signal transmission loss at high frequencies.

The above embodiments are provided for illustrating the principles of the present disclosure and its technical effect, and should not be construed as to limit the present disclosure in any way. The above embodiments can be modified by one of ordinary skill in the art without departing from the spirit and scope of the present disclosure. Therefore, the scope claimed of the present disclosure should be defined by the following claims.

What is claimed is:

1. An antenna substrate, comprising:

a wiring module comprising a circuit structure and a waveguide structure bonded to the circuit structure; and an antenna module provided on the wiring module and comprising an antenna layer, allowing a signal to be transmitted to the antenna layer through the waveguide structure.

2. The antenna substrate of claim 1, wherein the circuit structure includes a plurality of insulating layers and a plurality of circuit layers formed on the plurality of insulating layers.

3. The antenna substrate of claim 1, wherein the waveguide structure includes a waveguide cavity, a first metal layer and a second metal layer formed on opposite sides of the waveguide cavity, and a plurality of conductive vias formed in the waveguide cavity.

4. The antenna substrate of claim 3, wherein the plurality of conductive vias are formed on a side edge of the waveguide cavity to form a waveguide channel surrounded by the plurality of conductive vias in the waveguide cavity.

5. The antenna substrate of claim 3, wherein a thickness of the waveguide cavity is larger than or equal to 25 microns.

6. The antenna substrate of claim 3, wherein a distance between the conductive vias on relatively close two side edges of the waveguide cavity is between one and two times a signal resonance wavelength.

7. The antenna substrate of claim 3, wherein the waveguide cavity is made of a dielectric material.

8. The antenna substrate of claim 3, wherein the waveguide cavity is formed with a cavity containing air.

9. An electronic device, comprising:

an antenna substrate comprising:

a wiring module comprising a circuit structure and a waveguide structure bonded to the circuit structure; and an antenna module provided on the wiring module and comprising an antenna layer, allowing a signal to be transmitted to the antenna layer through the waveguide structure; and an electronic component provided on the antenna substrate.

10. The electronic device of claim 9, wherein the circuit structure includes a plurality of insulating layers and a plurality of circuit layers formed on the plurality of insulating layers.

11. The electronic device of claim 9, wherein the waveguide structure includes a waveguide cavity, a first metal layer and a second metal layer formed on opposite sides of the waveguide cavity, and a plurality of conductive vias formed in the waveguide cavity.

12. The electronic device of claim 11, wherein the plurality of conductive vias are formed on a side edge of the waveguide cavity to form a waveguide channel surrounded by the plurality of conductive vias in the waveguide cavity.

13. The electronic device of claim 11, wherein a thickness of the waveguide cavity is larger than or equal to 25 microns.

14. The electronic device of claim 11, wherein a distance between the conductive vias on relatively close two side edges of the waveguide cavity is between one and two times a signal resonance wavelength.

15. The electronic device of claim 11, wherein the waveguide cavity is made of a dielectric material.

16. The electronic device of claim 11, wherein the waveguide cavity is formed with a cavity containing air.

17. The electronic device of claim 9, wherein the electronic component is a radio frequency chip, which is provided on another side of the wiring module of the antenna substrate opposite to a side where the antenna module is provided, allowing the electronic component to transmit a signal to the antenna layer through the waveguide structure.

18. The electronic device of claim 9, wherein the electronic component is provided on the circuit structure of the wiring module and electrically connected to the circuit layer of the circuit structure.

19. The electronic device of claim 18, further comprising a plurality of conductive components provided on the circuit structure and on the same side as the electronic component.

* * * * *